Feb. 12, 1952     H. H. CLAASSEN     2,585,740
FAST X-RAY DIFFRACTION CAMERA
Filed March 2, 1946
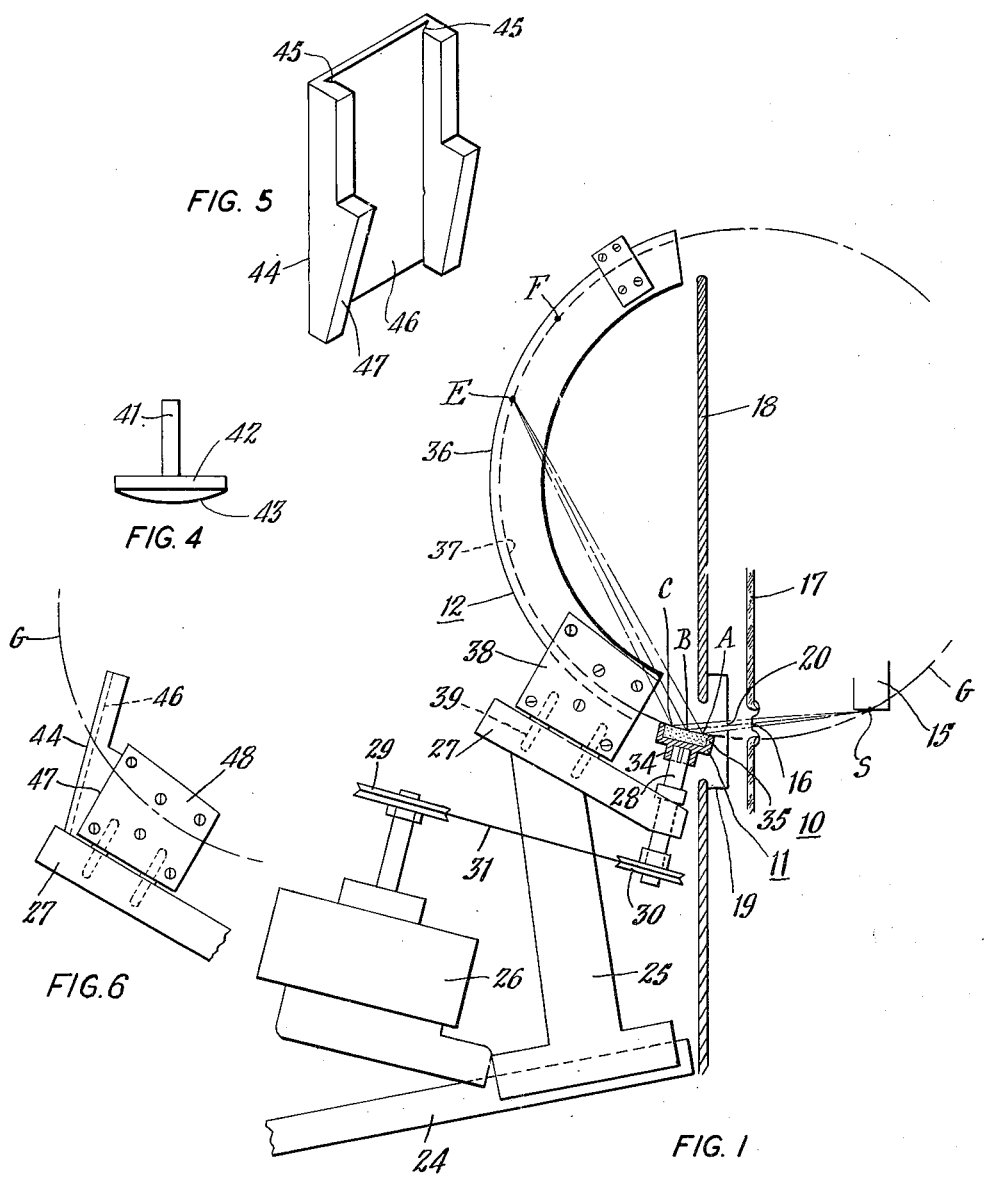
INVENTORS
H. H. CLAASSEN
K. E. BEU
BY
*Aristine, Wilhelm + Carlson*
ATTORNEYS Patented Feb. 12, 1952

2,585,740

UNITED STATES PATENT OFFICE 2,585,740

FAST X-RAY DIFFRACTION CAMERA

Howard H. Claassen and Karl E. Beu, Bartlesville, Okla., assignors to Phillips Petroleum Company, a corporation of Delaware Application March 2, 1946, Serial No. 651,511

9 Claims. (Cl. 250—53)

The invention relates to crystallography and more particularly to an X-ray diffraction camera for analyzing crystalline solids.

General objects of the invention are to provide a camera of the above type which is simple to use, which analyzes samples at higher speed and with greater accuracy.

According to a preferred form of the invention, the camera comprises a framework supporting an upstanding detachable, arcuate film holder, together with a motor-driven rotary sample cup. The sample to be tested is powdered and packed into the cup and the surface of the sample is scraped to a concave spherical shape. The arrangement is such that the cup can be disposed closely to the window of an X-ray tube to subject the sample to the direct action of rays emanating from the target of the X-ray tube. The concave spherical surface of the sample and the length of the film holder are laid out on the same focusing circle which also passes through the target. Such a camera is particularly suitable for routine quantitative analysis of crystalline solids, as for example, the analysis of well-cuttings for key mineral content.

The invention also consists in certain new and original features and combinations hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which:

Fig. 1 is a diagrammatic representation partly in section of a photographic system according to the invention;

Fig. 2 is a top view of the sample cup;

Fig. 3 is an end view, and Fig. 4 is a side view, of the scraping tool for preparing the sample;

Fig. 5 is a perspective of a modified form of film holder; and

Fig. 6 illustrates one manner of using the modified film holder of Fig. 5.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawing, and more particularly to Figs. 1 to 4, the photographic system comprises, generally, an upright X-ray tube 10, a rotary sample cup 11 and an upright arcuate film holder 12. The X-rays emanating from the target 15 of the tube 10 fall upon the rotary sample cup 11 and are diffracted onto the film 37 in the film holder 12, as illustrated. These parts are located on focusing circle G as explained below.

Although the invention is usable with various types of X-ray tubes, the use with one particular type, with which the invention has been successfully practiced, will be explained for purposes of illustration. This type is known as the General Electric XRD unit. Only so much of the X-ray tube is shown as is necessary for an understanding of the invention.

The X-ray tube 10 comprises the target 15 on which the electronic stream is directed at great velocity from the cathode (not shown), as will be understood by those skilled in the art. The tube is enclosed in a wall 17 having a window 16. The tube wall is surrounded by a metal housing 18 having a recessed lead shield 19 having a rectangular aperture 20 to define and limit the width of the beam of X-rays.

The film holder 12 and rotary cup 11 may be conveniently supported upon a frame, adjustable along track 24 toward and away from the X-ray tube. The track 24 supports a slidable support 25 having a telechron motor 26. Support 25 is attached to base 27 which journals the sample cup shaft 28. Shaft 28 has pulley 30 and motor 26 has pulley 29; around these pulleys is belt 31.

The cup 11 has a socket 34 detachably mounted on the shaft 27 in any desired manner. The cup 11 is constrained to rotate concentrically about the axis of shaft 28 and is detachable therefrom by merely lifting off the shaft. The cup 11 has a recess 35 into which a thick sample is packed, as will be explained more in detail hereinafter.

The film holder 12 has an arcuate pocket 36 made up of a cylindrical wall and side walls secured to a base 38. Base 38 is removably mounted upon base 27 by tapered pins 39 which may be fast in one of the detachable members and removable from sockets in the other. The arcuate track 36 has undercut grooves in its side wall (similar to grooves 45 in Figure 5) to removably support the photographic film 37.

Referring to Figs. 3 and 4, the scraping tool 42 has a spherical surface 43 whose radius is the same as the radius of the focusing circle G. The tool 42 has a suitable shaft 41 for mounting on any desirable holder (not shown) for the purpose of driving the tool so as to scrape the sample in cup 11 by action of the scraping surface 43. A spherical concave surface is thereby produced on the sample in cup 11 through which surface the focusing circle G passes.

Before describing the use of the invention, the geometrical relationship between the various parts will be briefly described. Assume that the X-ray beam originates at the point source S on target 15 located on the focusing circle G. This circle passes through the top edges of the recess 35 in sample cup 11, as indicated, the concave spherical surface of the sample in recess 35, and the cylindrical surface of the film 37 in the film holder 12. Assuming rays SA, SB and SC strike the sample in the rotary cup 11, these rays will be diffracted by one set of parallel atomic planes in the sample to some point E on the film. The angles through which these several rays are diffracted at the points A, B and C are all equal since it is a principle of plane geometry that angles inscribed in the same circle are equal if they subtend the same arc. Thus all of the rays diffracted by one set of parallel atomic planes will all strike the same point E on the film. Another set of atomic planes will diffract the rays at another angle and focus them on the film at another point F.

To use the camera, the sample to be tested is first ground to a powder, 200 mesh or smaller, and is packed in the sample cup 11 and then scraped to a concave spherical surface by the scraping tool shown in Figs. 3 and 4. The cup 11 is then replaced on the shaft 28.

Photograph film 37 is then placed in the curved pocket of the film holder 36, the film being covered with black paper to prevent exposure to light. The film holder is then replaced on base 27 by insertion of the tapered pins 39.

The camera is then adjusted, or brought into focus, by locating target 15 of X-ray tube 10 on the focusing circle G. The telechron motor 26 is then started, the X-ray tube turned on, and the film exposed to the action of X-rays diffracted from the sample.

Thus, photographic apparatus is provided which analyzes the samples at higher speed, with greater accuracy and more simply. Powder X-ray diffraction patterns are obtained very rapidly, making it practical to analyze for crystalline content large numbers of samples of a control or routine nature. The analysis may be either qualitative or quantitative.

The use of the target of the X-ray tube as the real source of X-rays, instead of a narrow slit as a virtual source, and the use of a larger sample makes very rapid exposures possible, this being important for routine analysis purposes. Diffraction patterns of powdered samples are obtained with the present invention in three to ten minutes as compared with one to three hours in the Debye-Scherrer type of camera. The finite size of the source produces more diffuse diffraction lines but this is an advantage in quantitative analysis since more reliable density values can be measured on the film with diffuse lines.

The slow rotation of the sample produces more uniform diffraction lines, and improves the effective randomness of orientation of the crystallites. The spherical shape sample makes such rotation possible and the spherical surface on the sample produces better focusing than a cylindrical surface would.

The thick sample makes the intensity of diffraction nearly independent of tightness of packing. The success of using such a thick sample requires small X-ray penetration. This condition is obtained with chromium (relatively soft) radiation with most samples and also with somewhat harder radiations with other samples. The X-ray beam striking a narrow section of the spherical sample surface satisfies the focusing condition, provided the penetration into the sample is small.

As stated above, window 20 in lead shield 19 regulates the size of the radiated rectangle of powder sample in cup 11 exposed to the irradiations. The size of this irradiated area is not critical so far as the "long" dimension is concerned. If the "width" dimension is too great, the diffraction lines tend to become slightly blurred. "Long," as herein used, means dimension along circle G, while "width" means dimension transverse thereto. No sharp limit can be set, but $\frac{3}{16}$ of an inch seems to be a reasonable limit to the width in the model shown. It is preferred to radiate only a small, centrally located portion of the sample, the rectangular area irradiated being approximately ½ inch long by ¼ inch or less wide.

Subject to these precautions, it does not matter how much or how little of the sample is radiated, nor where, on the sample, the irradiated area is located, so long as the beam of irradiations does not contact the edge of brass cup 11. Limitation of the irradiated area to the sample itself insures that all irradiations recorded at E and F, and elsewhere, are caused by the powder sample only.

Shield 19 may be removable and several modified forms of shield may be interchanged when desired, the window 20 in each shield 19 being cut to a different desired size.

The present invention permits the sample to be placed unusually close to the X-ray tube and thus obtain high intensity beam, making short exposures possible. Smoother diffraction lines are also obtained.

The present camera is particularly suitable for routine quantitative analysis of crystalline solids and particularly for the analysis of well-cuttings for key mineral content. However, it may be useful in other fields where a large number of samples are to be analyzed for crystalline content. Mineral composition varies among different shales. The diffraction X-ray intensity is nearly independent of the tightness of packing of the sample in the cup whereas in the older types, the intensity is highly dependent on closeness of packing in the sample tube. Thus quantitative analysis is possible without using an internal standard if a normal control is kept on the intensity and time of exposure.

Other uses for the camera, where quantitative analysis of solids is desired, are the routine testing of catalysts for crystalline structure or the measurement of the amount of graphitization of carbon black. This camera may also be used for making patterns of frozen hydrocarbons.

Among the uses for this camera is the analysis of shale samples for quartz content. In one set of analyses by the present camera, the quartz concentration varied between about 39% and 19%. As an estimate of the precision obtainable, the probable deviation of a single measurement was calculated from repeated measurements from the same sample and was found to be about 1% in a sample containing 19% of quartz.

Although the size and arrangement of the parts may vary considerably, the camera shown may have a focusing circle of 3.5 inch radius. The sample cup may have a sample recess of ⅞ of an inch in diameter and ⅛ of an inch in depth. The film may cover a range of approximately 20° to 90° deviation with the incident beam. The film may be one inch wide and seven inches long.

It is obvious that the arrangement of the parts may be varied considerably to meet various requirements. For example, the camera may be built light-tight to obviate the necessity for the black film covering. Also a greater angular range could be obtained by using a different X-ray tube or by laying out the focusing circle in a horizontal plane with axis of X-ray tube vertical, so that the film could be made longer without running into the X-ray tube.

Types of receivers other than photographic may be used. For example, an ionization chamber might be swept along the focusing circle to obtain the intensity distribution more accurately. A photon counter receiver may be used instead of photographic film.

If desired, in cases where X-rays penetrate the sample too far, or if an insufficient quantity of sample is available, the sample cup may be filled with an amorphous plastic molded to a concave spherical surface and the plastic surface sprinkled in a thin layer of the sample.

Furthermore, the camera may be backed away from the X-ray tube and a single slit inserted as a virtual source instead of the original source, to obtain sharper lines for better qualitative analysis although this could be done only at a sacrifice of speed.

As an example of one form of modification, a straight film holder may be used. Such a film holder is illustrated in Figs. 5 and 6. Here the holder 44 has a straight seat 46 for the film, the seat being undercut at 45 to hold the film (not shown). The side walls of the holder may have bevels 47 adapted to fit against a base 48, as indicated in Fig. 6. The base 48 may be identical with base 38 in Fig. 1 with the film holder 36 removed. The relationship of the modified film holder 44 to the focusing circle G is as illustrated in Fig. 6. The modified holder 44 may be manually held against the base 48 to obtain the relationship indicated.

The modified form of Figs. 5 and 6 is particularly useful where the important line in the spectrum is located at one point on the focusing circle, as for example, in the case where the sample is carbon black. It is thought that the use and advantages of this form will be apparent from the explanation given in regard to Figs. 1 to 4.

While certain novel features of the invention have been disclosed herein, and are pointed out in the annexed claims, it will be understood that various omissions, substitutions and changes may be made by those skilled in the art without departing from the spirit of the invention.

What is claimed is,

1. In a focusing, diffraction camera, a source of X-rays, a rotary support, a sample on said support, said sample being provided with a concave spherical surface, a receiver for rays diffracted from said sample; the surface of said sample, said receiver and said source all being located substantially on a focusing circle, the axis of said rotary support being substantially coincident with a diameter of said spherical surface.

2. In a fast, X-ray, focusing, diffraction camera, an X-ray tube having a target providing an original source of rays, a rotary support, a cup having a recess adapted to contain a powdered sample, a powdered sample in said recess having a concave spherical surface exposed to said rays, said cup being detachably mounted on said rotary support, a film holder having an arcuate pocket, a frame supporting said rotary support and said film holder with the edges of the cup recess and the arc of said pocket laid out on the focusing circle, and means for adjusting said frame with respect to said tube to locate said target on the focusing circle, the axis of said rotary support being substantially coincident with a diameter of said focusing circle.

3. In a fast X-ray focusing diffraction camera, an X-ray tube having a target providing an original source of rays, a rotary support, a cup having a recess adapted to contain a powdered sample, a powdered sample in said recess having a concave spherical surface exposed to said rays, said cup being detachably mounted on said rotary support, a film holder having a straight seat for the film, the outer edges of said cup recess and said target being located on the focusing circle, said straight seat intersecting said circle, the axis of said rotary support being substantially coincident with a diameter of said focusing circle.

4. In a fast X-ray diffraction camera, an X-ray tube having a target providing an original source of rays, a wall having a window and a housing having a recessed shield with a window to define a beam; a camera frame comprising a track extending transversely to the axis of the X-ray tube, an adjustable support on said track, a shaft journaled on said support, a sample cup having a recess adapted to receive a sample, a sample in said recess having a concave spherical surface exposed to said rays, said cup being removably mounted on said shaft, a motor on said support for rotating said shaft, a film holder comprising an undercut seat for the film and having a base detachable from said support, said film holder, and the edges of the cup recess being laid out on the focusing circle, said adjustable support being movable on said track with respect to said tube to locate the target on the focusing circle, the axis of said shaft being substantially coincident with a diameter of said focusing circle.

5. In a fast, X-ray, diffraction camera, an X-ray tube having a target providing an original source of rays, a wall having a window and a housing having a recessed lead shield with a rectangular window to define a beam; a camera frame comprising a track extending transversely to the axis of the X-ray tube, an adjustable support on said track, a shaft journaled on said support, a sample cup having a recess adapted to receive a thick powdered sample, a sample in said recess having a concave spherical surface exposed to said rays, said cup being removably mounted on said shaft, a motor on said support for rotating said shaft, an arcuate film holder comprising an undercut seat for the film and having a base detachable from said support, said arcuate film holder, and the outer edges of the cup recess being laid out on the focusing circle, said adjustable support being movable on said track with respect to said tube to locate said target on the focusing circle, the axis of said shaft being substantially coincident with a diameter of said focusing circle.

6. In a fast, X-ray, focusing, diffraction camera, an X-ray tube having a target providing an original source of divergent rays, a rotary support, a sample on said support, said sample having a concave spherical surface exposed to said rays, a receiver for the rays diffracted from said sample; said concave spherical surface, said receiver and said target all being located on the focusing circle; and a window between said target and said sample, said window limiting the area of the X-ray beam to provide an irradiated spot lying wholly within the area of said sample, the length of said spot, in the direction of the focusing circle, being comparatively large as compared to its width; the axis of said rotary support being substantially radial of said focusing circle and lying substantially in the plane thereof.

7. In an X-ray focusing diffraction camera, an X-ray tube having a target providing an original source of rays, a rotary support, said sample having a concave spherical surface exposed to said rays, a sample on said support, a window of finite size located between said target and sample determining the area of the sample exposed to said rays, and a receiver for rays diffracted from said sample; the surface of said sample, said receiver and said source all being located substantially on a focusing circle, the axis of said rotary support being substantially coincident with a diameter of said focusing circle.

8. In a focusing, diffraction camera, an X-ray tube having a target providing an original source of rays, a rotary support, a sample having a concave spherical surface on said support, a receiver for rays diffracted from said sample, the concave spherical surface of said sample, said receiver and said target all being located substantially on a focusing circle, the axis of rotation of said support being substantially coincident with a diameter of said focusing circle.

9. In a focusing, diffraction camera, a source of rays, a rotary support, said sample having a concave spherical surface exposed to said rays, a sample on said support, a film holder having a straight seat for the film, the surface of said sample being located substantially on a focusing circle which also substantially passes through said source and said seat, the axis of said rotary support being substantially radial of said focusing circle and lying substantially in the plane thereof.

HOWARD H. CLAASSEN.
KARL E. BEU.

REFERENCES CITED

The following references are of record in the file of this patent:

UNITED STATES PATENTS

| Number    | Name        | Date          |
|-----------|-------------|---------------|
| 2,025,488 | Chu-Phay Yap| Dec. 24, 1935 |
| 2,428,796 | Friedman    | Oct. 14, 1947 |
| 2,452,045 | Friedman    | Oct. 26, 1948 |
| 2,474,835 | Friedman    | July 5, 1949  |

OTHER REFERENCES

"The New X-Ray Microscope," by Gaylord Johnson, pgs. 278 to 282, May 1932, Scientific American.